United States Patent
Suzuki et al.

(10) Patent No.: US 10,899,046 B2
(45) Date of Patent: Jan. 26, 2021

(54) COMPOSITE MEMBER (71) Applicant: Nissan Motor Co., Ltd., Yokohama (JP)

(72) Inventors: Katsuhiko Suzuki, Kanagawa (JP); Takeshi Yoshida, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 15/575,889

(22) PCT Filed: Jun. 17, 2015

(86) PCT No.: PCT/JP2015/067467
§ 371 (c)(1),
(2) Date: Nov. 21, 2017

(87) PCT Pub. No.: WO2016/203576
PCT Pub. Date: Dec. 22, 2016

(65) Prior Publication Data
US 2018/0126605 A1    May 10, 2018

(51) Int. Cl.
*B29C 39/10* (2006.01)
*B32B 5/28* (2006.01)
*B32B 5/02* (2006.01)
*B29C 70/68* (2006.01)
(Continued)

(52) U.S. Cl.
CPC .............. *B29C 39/10* (2013.01); *B29C 45/14* (2013.01); *B29C 70/06* (2013.01); *B29C 70/18* (2013.01);
(Continued)

(58) Field of Classification Search
CPC .......... B29C 39/10; B29C 45/14; B29C 70/06; B29C 70/18; B29C 70/68; B29C 70/681;
(Continued)

(56) References Cited

U.S. PATENT DOCUMENTS

| 3,895,084 A | * | 7/1975 | Bauer | ................... C04B 35/806 156/89.26 |
|---|---|---|---|---|
| 2014/0322482 A1 | | 10/2014 | Sinha et al. | |
| 2016/0016359 A1 | | 1/2016 | Kondo et al. | |

FOREIGN PATENT DOCUMENTS

| CN | 101293408 A | 10/2008 |
|---|---|---|
| CN | 101462382 A | 6/2009 |

(Continued)

OTHER PUBLICATIONS

LinguaLinx Language Solutions, Inc., human translation of Shimoda, JP 2013122285-A, Oct. 2019 (Year: 2019).*

*Primary Examiner* — Michael M. Robinson
(74) *Attorney, Agent, or Firm* — Global IP Counselors, LLP (57) ABSTRACT

A composite member is provided with a bonding member made of a fiber-reinforced resin and a bracket in which the bracket is bonded to the bonding member via a resin. The bracket has a through-hole. The bonding member has a front surface side fiber-reinforced resin sheet and a rear-surface-side fiber-reinforced resin sheet. The front surface side fiber-reinforced resin sheet, the rear surface side fiber-reinforced resin sheet and the bracket are integrally bonded to each other by the resin in a state in which the front surface side fiber-reinforced resin sheet is inserted into the through-hole of the bracket to thereby enhance the bonding strength between the bonding member to the bracket.

6 Claims, 7 Drawing Sheets

(51) Int. Cl.
*B29C 70/06* (2006.01)
*B29C 45/14* (2006.01)
*B29C 70/74* (2006.01)
*B29C 70/18* (2006.01)
*B29K 105/08* (2006.01)

(52) U.S. Cl.
CPC ............ *B29C 70/68* (2013.01); *B29C 70/681* (2013.01); *B29C 70/685* (2013.01); *B29C 70/745* (2013.01); *B32B 5/024* (2013.01); *B32B 5/28* (2013.01); *B29K 2105/0809* (2013.01); *B32B 2260/023* (2013.01); *B32B 2262/106* (2013.01)

(58) Field of Classification Search
CPC ..... B29C 70/685; B29C 70/745; B32B 5/024; B32B 5/28
See application file for complete search history.

(56) References Cited

FOREIGN PATENT DOCUMENTS

| | | | |
|---|---|---|---|
| CN | 103640267 | A | 3/2014 |
| JP | 4-286628 | A | 10/1992 |
| JP | 5-4281 | A | 1/1993 |
| JP | 5-96680 | A | 4/1993 |
| JP | 2003-305775 | A | 10/2003 |
| JP | 2013-23184 | A | 2/2013 |
| JP | 2013-122285 | A | 6/2013 |
| JP | 2013122285 | A * | 6/2013 |
| JP | 2015-044339 | A | 3/2015 |
| JP | 2016-016592 | A | 2/2016 |
| JP | 2016-083811 | A | 5/2016 |
| WO | 2014/142189 | A1 | 9/2014 |

* cited by examiner

COMPOSITE MEMBER

This application is a U.S. National stage application of International Application No. PCT/JP2015/067467, filed Jun. 17, 2015.

BACKGROUND

Field of the Invention

The present invention relates to a composite member, and more specifically to a composite member that uses a fiber-reinforced resin.

Background Information

Conventionally, a composite member obtained by bonding a bonding member containing a fiber-reinforced resin to a member to be bonded is known (for example, refer to Patent Document 1).

A hood outer panel (composite member) disclosed in Japanese Laid-Open Patent Application No. 2013-23184 (Patent Document 1) is obtained by bonding an outer panel body (composite member) made of carbon fiber-reinforced resin and a metal bracket (bonded member) with a matrix resin, in a state in which the outer panel body is inserted into the metal bracket.

Specifically, first, a front surface layer made of a carbon fiber woven fabric is disposed on the front surface side of a metal bracket having a through-hole, and a nonwoven fabric and a rear surface layer made of carbon fiber woven fabric are disposed on the rear surface side of the metal bracket. Next, the metal bracket, the front surface layer, the nonwoven fabric, and the rear surface layer are placed in a metal mold, molten resin (matrix resin) is poured into the metal mold, and the metal mold is opened after the molten resin has cured, at which point the metal bracket is bonded to the outer panel body via the matrix resin. The hood outer panel described above is thereby completed.

In the above-described Patent Document 1, the fibers of the front surface layer and the fibers of the nonwoven fabric are not inserted in the through-hole of the metal bracket, while the molten resin flows into the through-hole of the metal bracket and is hardened.

SUMMARY

However, in recent years, further improvements in the bonding strength have been desired when bonding a bonded member, such as a metal bracket, and a bonding member, such as a front surface layer, a rear surface layer, and a nonwoven fabric.

Therefore, an object of the present invention is to provide a composite member that can further improve the bonding strength between a bonding member and a bonded member to.

The composite member according to the present invention is obtained by bonding a bonding member made of fiber-reinforced resin to a bonded member comprising a through-hole. Specifically, a front surface side fiber-reinforced resin, a rear surface side fiber-reinforced resin, and a bonded member are integrally bonded with a resin, in a state in which the fibers of at least one fiber-reinforced resin of the rear surface side fiber-reinforced resin and the front surface side fiber-reinforced resin, which are bonding members, are inserted in the through-hole of the bonded member.

According to the composite member of the present invention, a bonding member and a bonded member are integrally bonded with a resin, in a state in which the fibers of at least one fiber-reinforced resin of the front surface side fiber-reinforced resin and the rear surface side fiber-reinforced resin are inserted in a through-hole of the bonded member. Therefore, the fibers inserted in the through-hole of the bonded member are bonded to the inner perimeter surface of the through-hole. Therefore, when fibers are inserted in a through-hole of a bonded member, as in the present invention, the bonding strength between the bonding member and the bonded member is further enhanced, compared to a case in which fibers are not inserted in a through-hole of the bonded member.

BRIEF DESCRIPTION OF THE DRAWINGS

Referring now to the drawings, composite members are illustrated according illustrative embodiments of the present invention.

DETAILED DESCRIPTION OF THE EMBODIMENTS

Embodiments of the present invention will be described below based on the drawings.

First Embodiment

First, the composite member according to a first embodiment of the present invention will be described.

Figure 1:
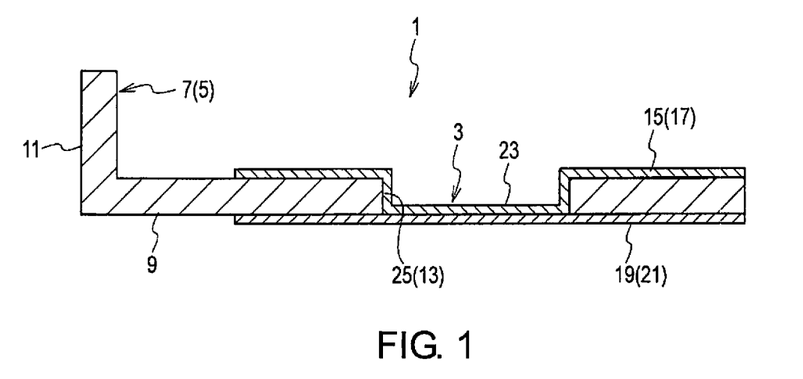
FIG. 1 is a cross-sectional view of a composite member according to a first embodiment of the present invention.

The composite member 1 according to the first embodiment comprises a bonding member 3 having two or more fiber-reinforced resins containing a multiplicity of continuous fibers, and a bonded member 5 that is bonded to the bonding member 3 via a resin, as illustrated in FIG. 1.

Specifically, the bonded member 5 is a bracket 7 made of metal, such as a steel plate. This bracket 7 is formed in an L-shape in side view from a flat plate-shaped main body portion 9, and an extending portion 11 that is bent along an edge of the plate main body portion 9 and extends upwardly. Various metals may be employed, and the applicable thickness is, for example, 1.0-5.0 mm. In addition, a through-hole 13 is formed in the plate main body portion 9. Various shapes may be employed for this through-hole 13, and a hole diameter of 5.0-50 mm, for example, may be applied.

The bonding member 3 comprises a front surface side fiber-reinforced resin sheet 15 (front surface side fiber-reinforced resin 17) formed in a plate shape and disposed on the front surface side of the bracket 7 (bonded member 5), and a rear surface side fiber-reinforced resin sheet 19 (rear surface side fiber-reinforced resin 21) formed in a plate shape and disposed on the rear surface side of the bracket 7 (bonded member 5).

The front surface side fiber-reinforced resin sheet 15 contains multiple carbon fibers (continuous fibers), and the applicable sheet thickness is, for example, 0.4-3.0 mm. The rear surface side fiber-reinforced resin sheet 19 contains multiple carbon fibers (continuous fibers), and the applicable sheet thickness is, for example, 0.4-5.0 mm.

Here, the portion of the front surface side fiber-reinforced resin sheet 15 that corresponds to the through-hole 13 of the bracket 7 is inserted in the through-hole 13 of the bracket 7 and brought close to the rear surface side fiber-reinforced resin sheet 19. That is, the portion of the front surface side fiber-reinforced resin sheet 15 that corresponds to the through-hole 13 of the bracket 7 is formed in a recessed portion 23, and the rear surface side fiber-reinforced resin sheet 19 is formed in a planar shape across the entire surface. The side surface of the recessed portion 23 of the front surface side fiber-reinforced resin sheet 15 is disposed along the inner perimeter surface 25 of the through-hole of the bracket 7. In this manner, in the first embodiment, a composite member 1 is molded by integrally bonding the front surface side fiber-reinforced resin sheet 15, the rear surface side fiber-reinforced resin sheet 19, and the bracket 7 to each other with resin in a state in which the fibers of the front surface side fiber-reinforced resin sheet 15 are inserted into the through-hole 13 of the bracket 7.

The action and effects of the first embodiment will be described below.

(1) The composite member 1 according to the first embodiment comprises a bonding member 3 made of a fiber-reinforced resin containing multiple continuous fibers, and a bracket 7 (bonded member 5) that is bonded to the bonding member 3 via a resin. The bracket 7 has a through-hole 13 that extends through in the thickness direction, and the bonding member 3 comprises a front surface side fiber-reinforced resin sheet 15 (front surface side fiber-reinforced resin 17) that is disposed on the front surface side of the bracket 7, and a rear surface side fiber-reinforced resin sheet 19 (rear surface side fiber-reinforced resin 21) that is disposed on the rear surface side of the bracket 7. The bonding member 3 is bonded to the bracket 7 by integrally bonding the front surface side fiber-reinforced resin sheet 15, the rear surface side fiber-reinforced resin sheet 19, and the bracket 7 to each other by the resin, in a state in which the fibers of at least one fiber-reinforced resin of the front surface side fiber-reinforced resin sheet 15 and the rear surface side fiber-reinforced resin sheet 19 are inserted in the through-hole 13 of the bracket 7.

In this manner, in a state in which the fibers of at least one fiber-reinforced resin of the front surface side fiber-reinforced resin sheet 15 and the rear surface side fiber-reinforced resin sheet 19 are inserted in the through-hole 13 of the bracket 7, the bonding member 3 and the bracket 7 are integrally bonded to each other by the resin. Therefore, the fibers that are inserted in the through-hole 13 of the bracket 7 are bonded to the inner perimeter surface 25 of the through-hole 13 by means of the resin. Therefore, when fibers are inserted in a through-hole 13 of the bracket 7, as in the present invention, the bonding strength between the bonding member 3 and the bracket 7 is further enhanced, compared to a case in which fibers are not inserted in a through-hole 13 of the bracket 7.

Second Embodiment

Next, the second embodiment will be described, but the configurations that are the same as the above-described first embodiment are given the same reference symbols, and the descriptions thereof are omitted.

Figure 2:
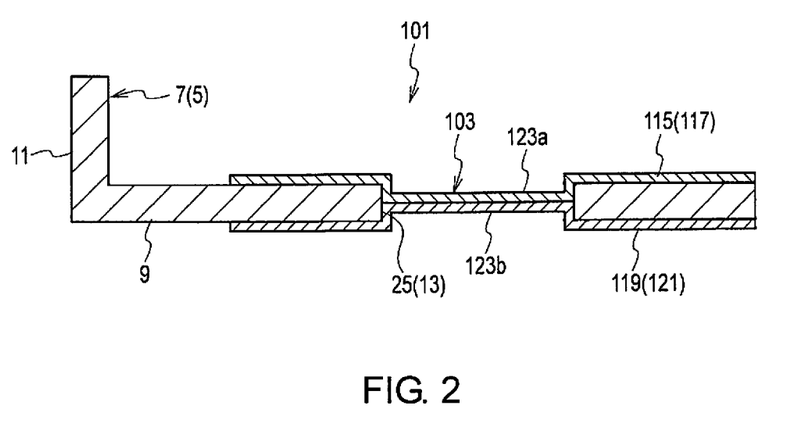
FIG. 2 is a cross-sectional view of a composite member according to a second embodiment of the present invention.

In the first embodiment, only the front surface side fiber-reinforced resin sheet is inserted in the through-hole of the bracket to form a recessed portion. However, in the composite member 101 according to the second embodiment, portions of both the front surface side fiber-reinforced resin sheet 115 (front surface side fiber-reinforced resin 117) and the rear surface side fiber-reinforced resin sheet 119 (rear surface side fiber-reinforced resin 121) that correspond to the through-hole 13 of the bracket 7 (bonded member 5) are inserted in the through-hole 13 of the bracket 7, to bring both the front surface side fiber-reinforced resin sheet 115 and the rear surface side fiber-reinforced resin sheet 119 in contact with each other, as illustrated in FIG. 2. As a result, a recessed portion 123a is formed on the front surface side fiber-reinforced resin sheet 115, and a recessed portion 123b is also formed on the rear surface side fiber-reinforced resin sheet 119. That is, the height position at which the recessed portions 123a, 123b of both the front surface side fiber-reinforced resin sheet 115 and the rear surface side fiber-reinforced resin sheet 119 that correspond to the through-hole 13 of the bracket 7 come into contact with each other is the center portion of the bracket 7 (bonded member 5) in the thickness direction.

The action and effects of the second embodiment will be described below.

(1) A bonding member 103 and a bonded member 5 are integrally bonded with a resin, in a state in which the fibers of at least one fiber-reinforced resin of the front surface side fiber-reinforced resin sheet 115 (front surface side fiber-reinforced resin 117) and the rear surface side fiber-reinforced resin sheet 119 (rear surface side fiber-reinforced resin 121) are inserted in a through-hole 13 of the bracket 7 (bonded member 5). Therefore, the fibers inserted in the through-hole 13 of the bonded member 5 are bonded to the inner perimeter surface 25 of the through-hole 13. Therefore, when the fibers are inserted in a through-hole 13 of a bonded member 5, as in the present invention, the bonding strength between the bonding member 103 and the bonded member 5 is further enhanced, compared to a case in which fibers are not inserted in a through-hole 13 of the bonded member 5.

Third Embodiment

Next, the third embodiment will be described, but the configurations that are the same as the above-described first and second embodiments are given the same reference symbols, and the descriptions thereof are omitted.

Figure 3:
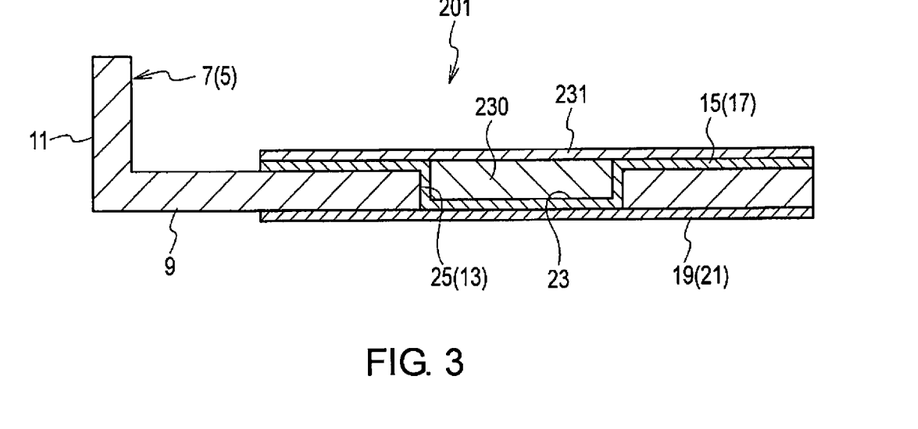
FIG. 3 is a cross-sectional view of a composite member according to a third embodiment of the present invention.

In the composite member 201 according to the third embodiment, a spacer 230 and a coating fiber-reinforced resin sheet 231 are added in the recessed portion 23 of the composite member 1 according to the first embodiment, as illustrated in FIG. 3.

Specifically, the portion of the front surface side fiber-reinforced resin sheet 15 that corresponds to the through-hole 13 of the bracket 7 is inserted in the through-hole 13 of the bracket 7 and brought close to the rear surface side fiber-reinforced resin sheet 19, to thereby form a recessed portion 23 on the front surface side fiber-reinforced resin sheet 15. Then, a plate-like spacer 230 of predetermined thickness is housed in the recessed portion 23. For example, a nonwoven fabric layer (low density foam) can be used as this spacer 230, and the thickness of the spacer 230 is preferably the same as the depth of the recessed portion 23 (for example, 1.0-5.0 mm). The applicable fiber length of the discontinuous fibers constituting the nonwoven fabric layer of the spacer 230 is, for example, 15-60 mm. In addition to a nonwoven fabric layer, one in which multiple pores are formed may be used as the spacer. Furthermore, the coating fiber-reinforced resin sheet 231 contains carbon fibers (continuous fibers), and the applicable sheet thickness is, for example, 0.4-5.0 mm. A composite member 201 according to the third embodiment is molded by integrally bonding the front surface side fiber-reinforced resin sheet 15, the rear surface side fiber-reinforced resin sheet 19, the spacer 230, the coating fiber-reinforced resin sheet 231, and the bracket 7 to each other with resin in a state in which the front surface side fiber-reinforced resin sheet 15 and the spacer 230 are covered with the planar coating fiber-reinforced resin sheet 231.

The action and effects of the third embodiment will be described below.

(1) A recessed portion 23 is formed by one of the front surface side fiber-reinforced resin sheet 15 and the rear surface side fiber-reinforced resin sheet 19, and a spacer 230 is disposed in the recessed portion 23. Here, if a spacer 230 is not disposed in the recessed portion 23, there is the risk that the portion corresponding to the recessed portion 23 will become dented if the coating fiber-reinforced resin sheet 231 is pressed. Therefore, by disposing a spacer 230 in the recessed portion 23, when the coating fiber-reinforced resin sheet 231 is pressed, the coating fiber-reinforced resin sheet 231 comes in contact with the surface of the spacer 230 and generates an appropriate reaction force; it is thereby possible to suppress a depression deformation of the coating fiber-reinforced resin sheet 231.

Fourth Embodiment

Next, the fourth embodiment will be described, but the configurations that are the same as the above-described first to third embodiments are given the same reference symbols, and the descriptions thereof are omitted.

Figure 4:
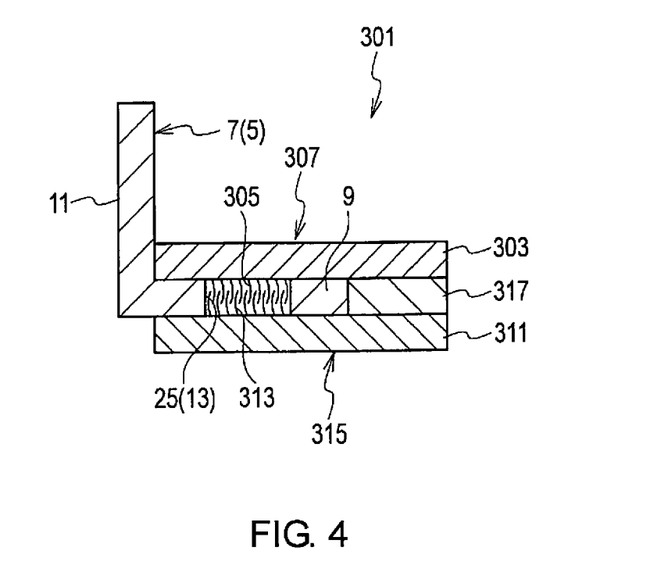
FIG. 4 is a cross-sectional view of a composite member according to a fourth embodiment of the present invention.

In the composite member 301 according to the fourth embodiment, the front surface side fiber-reinforced resin of the bonding member is a first fiber layer 307 in which a nap 305 is provided on the rear surface of a fiber substrate 303, and the rear surface side fiber-reinforced resin of the bonding member is a second fiber layer 315 in which a nap 313 is provided on the front surface of a fiber substrate 311, as illustrated in FIG. 4. The first fiber layer 307 described above is disposed on the front surface side of the bracket 7, and the nap 305 of the first fiber layer 307 is inserted in the through-hole 13 of the bracket 7. In addition, the second fiber layer 315 of the bonding member is disposed on the rear surface side of the bracket 7, and the nap 313 of the second fiber layer 315 is inserted in the through-hole 13 of the bracket 7. As a result, the first fiber layer 307, the second fiber layer 315, and the bracket 7 are integrally bonded to each other by the resin, in a state in which the nap 305 of the first fiber layer 307 and the nap 313 of the second fiber layer 315 are intertwined with each other inside the through-hole 13 of the bracket 7. The applicable thickness of the fiber substrate 303 of the first fiber layer 307 and the fiber substrate 311 of the second fiber layer 315 is, for example, 0.4-5.0 mm. Furthermore, a holding substrate 317 that is formed to have the same thickness as the bracket 7 is sandwiched between the fiber substrate 303 of the first fiber layer 307 and the fiber substrate 311 of the second fiber layer 315. This holding substrate 317 is interposed for the purpose of preventing the first fiber layer 307 and the second fiber layer 315 from becoming dented when the first fiber layer 307 and the second fiber layer 315 are pressed against each other in the thickness direction.

The action and effects of the fourth embodiment will be described below.

(1) Since the nap 305 of the first fiber layer 307 and the nap 313 of the second fiber layer 315 are integrally bonded to each other with the resin in a state of being entangled with each other inside the through-hole 13 of the bracket 7, the bonding strength between the bonding member and the bonded member is further enhanced.

Fifth Embodiment

Next, the fifth embodiment will be described, but the configurations that are the same as the above-described first to fourth embodiments are given the same reference symbols, and the descriptions thereof are omitted.

Figure 5:
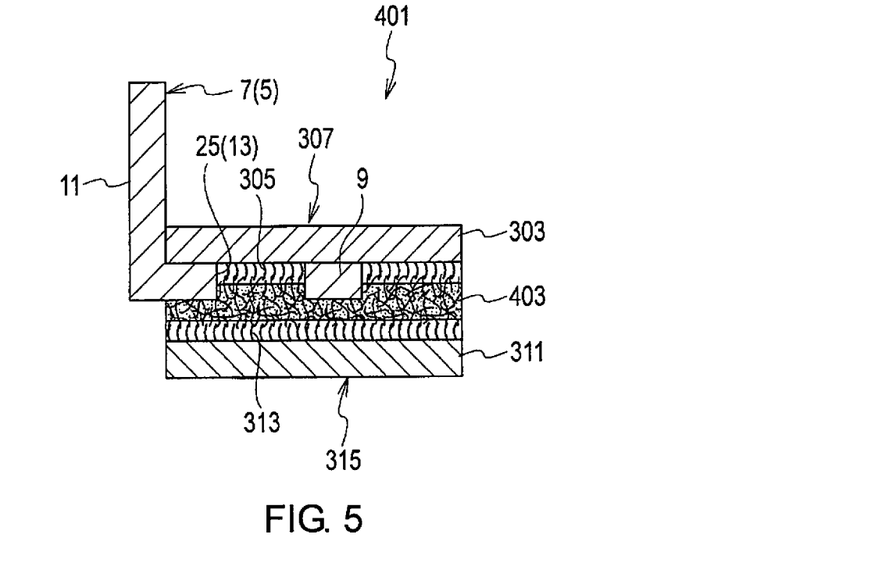
FIG. 5 is a cross-sectional view of a composite member according to a fifth embodiment of the present invention.

In the composite member 401 according to the fifth embodiment, the front surface side fiber-reinforced resin of the bonding member is a first fiber layer 307 in which a nap 305 is provided on the rear surface of a fiber substrate 303, and the rear surface side fiber-reinforced resin of the bonding member is a second fiber layer 315 in which a nap 313 is provided on the front surface of a fiber substrate 311, as illustrated in FIG. 5. The first fiber layer 307 described above is disposed on the front surface side of the bracket 7, and the nap 305 of the first fiber layer 307 is inserted in the through-hole 13 of the bracket 7. The second fiber layer 315 of the bonding member is disposed on the rear surface side of the bracket 7, a nonwoven fabric layer 403 is disposed between the second fiber layer 315 of the bonding member and the bracket 7, and the fibers of the nonwoven fabric layer 403 are intertwined with both the nap 305 of the first fiber layer 307 and the nap 313 of the second fiber layer 315, which are inserted in the through-hole 13 of the bracket 7. The composite member 401 according to the fifth embodiment is molded by integrally bonding the first fiber layer 307, the second fiber layer 315, the nonwoven fabric layer 403, and the bracket 7 to each other by the resin in this state. The applicable thickness of the fiber substrate 303 of the first fiber layer 307 and the fiber substrate 311 of the second fiber layer 315 is, for example, 0.4-5.0 mm. Additionally, the applicable thickness of the nonwoven fabric layer 403 is, for example, 0.2-10.0 mm.

The action and effects of the fifth embodiment will be described below.

(1) The fibers of the nonwoven fabric layer 403 are intertwined with the nap 305 of the first fiber layer 307, and the fibers of the nonwoven fabric layer 403 are intertwined with the nap 313 of the second fiber layer 315. In this manner, the first fiber layer 307 is connected to the second fiber layer 315 via the nonwoven fabric layer 403. Therefore, since the bonding member holds the bonded member by sandwiching same from the front side and the rear side, the bonding strength between the bonding member and the bonded member is further enhanced.

Furthermore, the bonding strength between the bonding member and the bonded member is further enhanced by disposing the nap 305 of the first fiber layer 307 and the nap 313 of the second fiber layer 315 in portions other than the through-hole 13 of the bracket 7, and causing same to intertwine with the fibers of the nonwoven fabric layer 403.

Sixth Embodiment

Next, the sixth embodiment will be described, but the configurations that are the same as the above-described first to fifth embodiments are given the same reference symbols, and the descriptions thereof are omitted.

Figure 6:
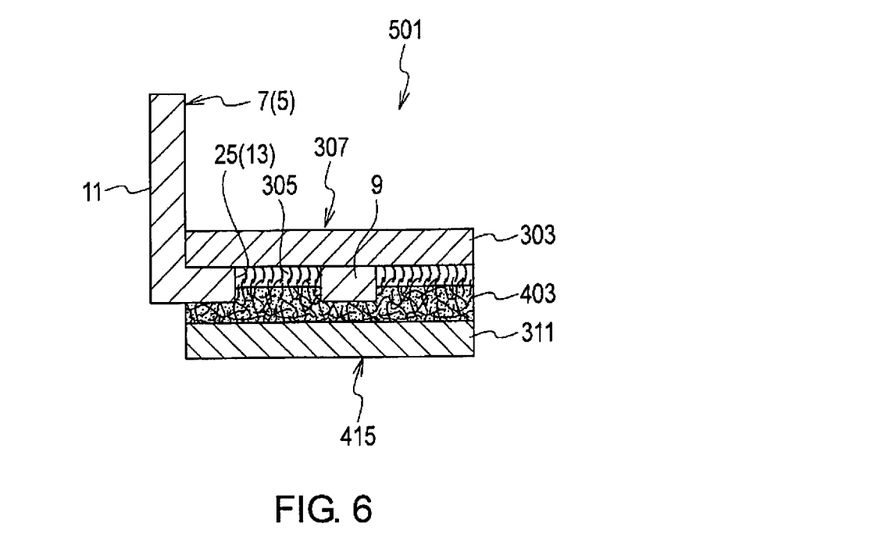
FIG. 6 is a cross-sectional view of a composite member according to a sixth embodiment of the present invention.

In the composite member 501 according to the sixth embodiment, the front surface side fiber-reinforced resin of the bonding member is a first fiber layer 307 in which a nap 305 is provided on the rear surface of a fiber substrate 303, and the rear surface side fiber-reinforced resin of the bonding member is a third fiber layer 415 made of a fiber substrate 311, as illustrated in FIG. 6

The first fiber layer 307 described above is disposed on the front surface side of the bracket 7, and the nap 305 of the first fiber layer 307 is inserted in the through-hole 13 of the bracket 7. The third fiber layer 415 of the bonding member is disposed on the rear surface side of the bracket 7. In addition, a nonwoven fabric layer 403 is disposed between the third fiber layer 415 of the bonding member and the bracket 7, and the bonding member is bonded to the bracket 7 by integrally bonding the first fiber layer 307, the third fiber layer 415, the nonwoven fabric layer 403, and the bracket 7 to each other with the resin, in a state in which the fibers of the nonwoven fabric layer 403 are intertwined with the nap 305 of the first fiber layer 307 inserted in the through-hole 13 of the bracket 7. The applicable thickness of the fiber substrate 303 of the first fiber layer 307 and the fiber substrate 311 of the second fiber layer 315 is, for example, 0.4-5.0 mm. Additionally, the applicable thickness of the nonwoven fabric layer 403 is, for example, 0.4-5.0 mm.

The action and effects of the sixth embodiment will be described below.

(1) Since the bonding member holds the bonded member by sandwiching same from the front side and the rear side, the bonding strength between the bonding member and the bonded member is further enhanced.

Seventh Embodiment

Next, the seventh embodiment will be described, but the configurations that are the same as the above-described first to sixth embodiments are given the same reference symbols, and the descriptions thereof are omitted.

In the seventh embodiment, the resin injection method for producing the composite member 201 according to the above-described third embodiment will be described.

Figure 7:
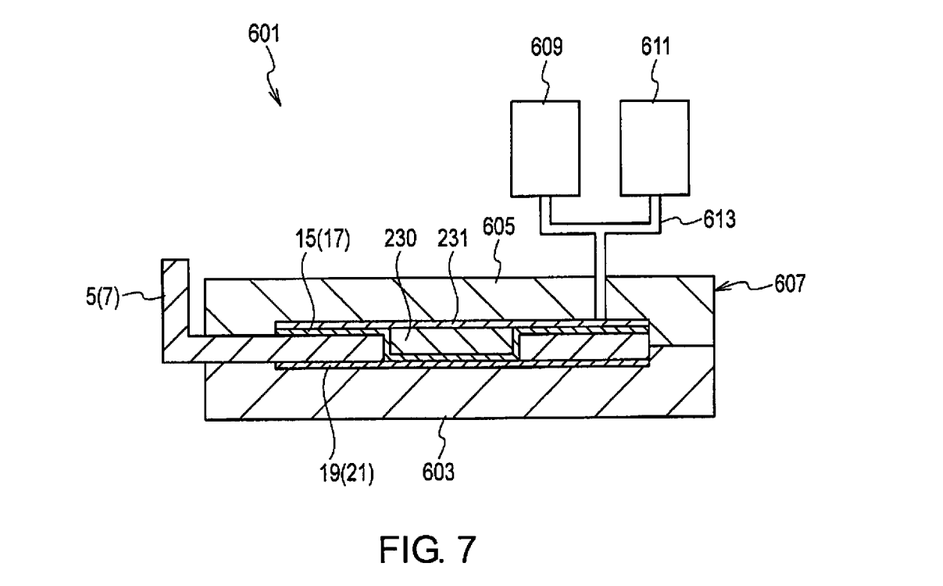
FIG. 7 is a cross-sectional view explaining the resin injection method for molding the composite member of the present invention.

The molding device 601 used in the resin injection method is configured from a metal mold 607 comprising a lower die 603 disposed on the lower side and an upper mold 605 disposed on the upper side, a first tank 609 and a second tank 611 that store the molten resin to be poured into a cavity inside the metal mold 607, and a pipe 613 that connects the first tank 609 and the second tank 611 with the cavity inside the metal mold 611, as illustrated in FIG. 7.

First, the rear surface side fiber-reinforced resin sheet 19, the front surface side fiber-reinforced resin sheet 15, the spacer 230, the coating fiber-reinforced resin sheet 231, and the bracket 7 are arranged in the lower die 603. Thereafter, the upper die 605 is closed, and molten resin is poured from the first tank 609 and the second tank 611 into the cavity inside the metal mold 607 via the pipe 613. Then, when the molten resin penetrates the rear surface side fiber-reinforced resin sheet 19, the front surface side fiber-reinforced resin sheet 15, the spacer 230, and the coating fiber-reinforced resin sheet 231, and the molten resin cools and solidifies, the bracket 7 is bonded to the bonding member (fiber-reinforced resin sheets 15 and 19) by the resin, and a composite member 201 is formed. Then, the metal mold 607 is opened and the composite member 201 is removed.

Eighth Embodiment

Next, the eighth embodiment will be described, but the configurations that are the same as the above-described first to seventh embodiments are given the same reference symbols, and the descriptions thereof are omitted.

In the eighth embodiment, the prepreg method for producing the composite member 201 according to the above-described third embodiment will be described.

Figure 8:
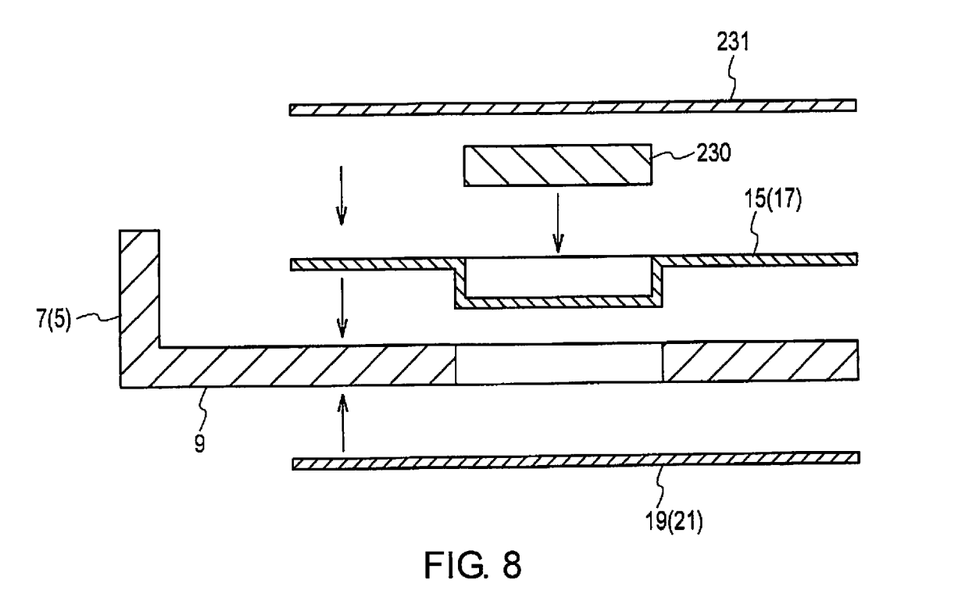
FIG. 8 is a cross-sectional view explaining the prepreg method for molding the composite member of the present invention.

A prepreg is prepared by impregnating the rear surface side fiber-reinforced resin sheet 19, the front surface side fiber-reinforced resin sheet 15, the spacer 230, and the coating fiber-reinforced resin sheet 231 according to the above-described third embodiment with molten resin and drying same, as illustrated in FIG. 8. Next, the prepreg and the bracket 7 are placed in a metal mold, which is not shown, and a high-temperature, high-pressure state is maintained. Then, the prepreg and the bracket 7 are bonded, and a composite member is formed.

Other Embodiment

Next, applicable first fiber layers in the above-described fourth to sixth embodiments will be described using FIGS. 9-12.

Figure 9A:
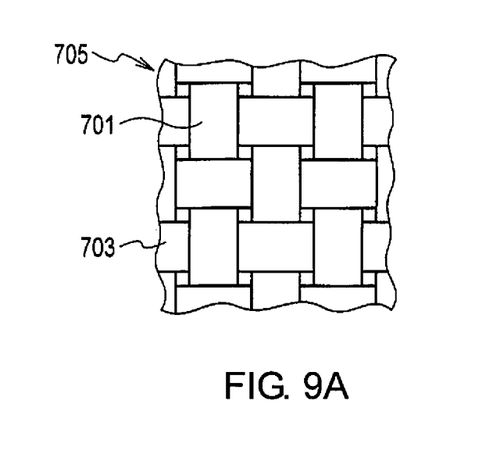
FIG. 9A is a plan view of the fabric having first and second fiber layers.
Figure 9B:
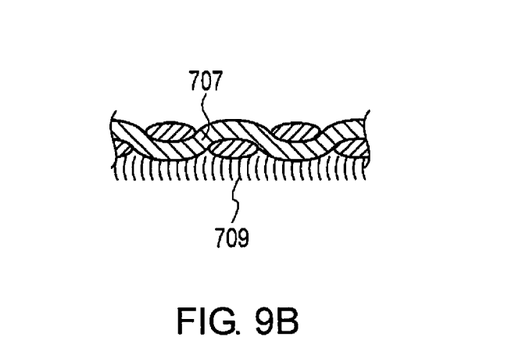
FIG. 9B is a cross-sectional view of the fabric illustrated in FIG. 9A.
Figure 10A:
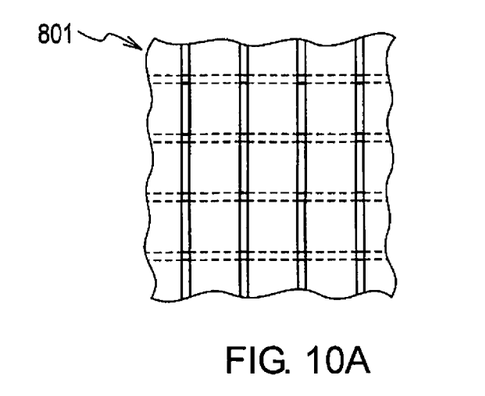
FIG. 10A is a plan view of a multiaxial substrate having first and second fiber layers.
Figure 10B:
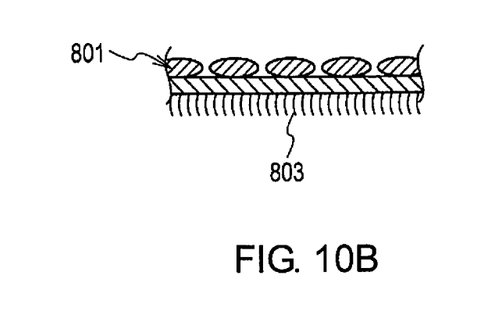
FIG. 10B is a cross-sectional view of the multiaxial substrate illustrated in FIG. 10A.
Figure 11:
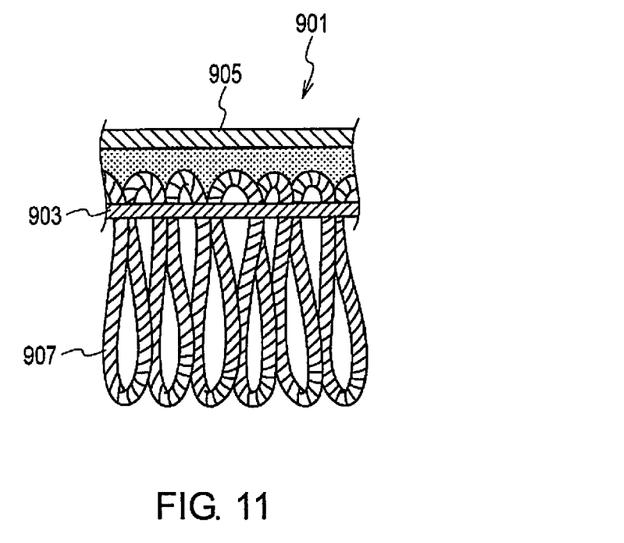
FIG. 11 is a view illustrating a pile as the first and second fiber layers.
Figure 12:
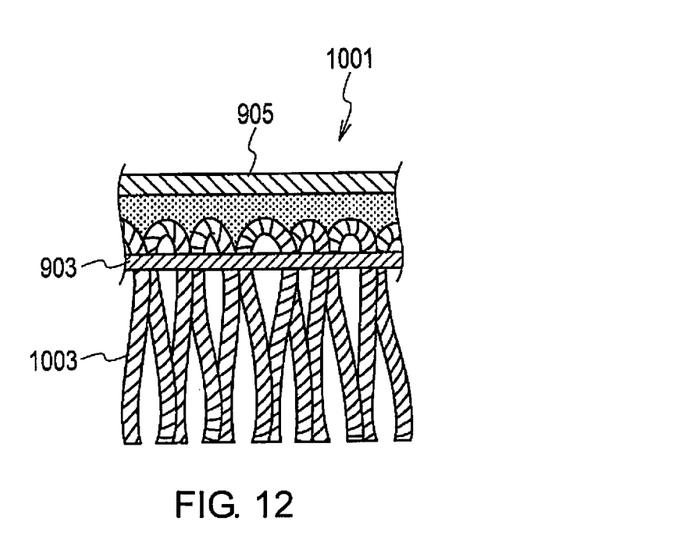
FIG. 12 is a view illustrating a cut pile as the first and second fiber layers.

FIG. 9 is a woven fabric 705 in which warp threads 701 and weft threads 703 are woven orthogonally, and a nap 709 extends from the rear surface of the fiber substrate 707. FIG. 10 is a multiaxial substrate 801, also called a non-crimp fabric (N.C.F), and a nap 803 is provided on the rear surface. FIG. 11 is a pile 901, and is obtained by connecting a pile yarn 907 to a first base fabric 903 and a second base fabric 905. FIG. 12 is a cut pile 1001, in which the distal end of the pile 901 of FIG. 11 is cut, and a nap 1003 is provided on the rear surface thereof.

The present invention is not limited to the above-described embodiments, and various modifications and changes are possible. For example, in FIG. 1, the front surface side fiber-reinforced resin sheet 15 and the rear surface side fiber-reinforced resin sheet 19 were placed in contact inside the through-hole 13 of the bracket 7; however, a gap may be provided between the front surface side fiber-reinforced resin sheet 15 and the rear surface side fiber-reinforced resin sheet 19, and the two may be disposed in proximity to each other.

Similarly, in FIG. 2, the front surface side fiber-reinforced resin sheet 115 and the rear surface side fiber-reinforced resin sheet 119 were placed in contact inside the through-hole 13 of the bracket 7; however, a gap may be provided between the front surface side fiber-reinforced resin sheet 115 and the rear surface side fiber-reinforced resin sheet 119, and the two may be disposed in proximity to each other.

The invention claimed is:

1. A composite member comprising:
a bonding member; and
a bracket bonded to the bonding member via a resin, wherein:
the bracket has a through-hole that passes through in a thickness direction,
the bonding member comprises a front surface side fiber-reinforced resin sheet disposed on a front surface side of the bracket, and a rear surface side fiber-reinforced resin sheet disposed on a rear surface side of the bracket,
each of the front surface side fiber-reinforced resin sheet and the rear surface side fiber-reinforced resin sheet comprise a fiber-reinforced resin containing multiple continuous fibers, and
the front surface side fiber-reinforced resin sheet, the rear surface side fiber-reinforced resin sheet and the bracket are integrally bonded with the resin in a state in which the fibers of both of the front surface side fiber-reinforced resin sheet and the rear surface side fiber-reinforced resin sheet are inserted in the through-hole to thereby bond the fibers that are inserted in the through-hole to an inner perimeter surface of the bracket formed by the through-hole by the resin.

2. The composite member as recited in claim 1, wherein:
the front surface side fiber-reinforced resin sheet of the bonding member is formed in a plate shape,
the rear surface side fiber-reinforced resin sheet of the bonding member is formed in a plate shape, and
a portion of at least one of the front surface side fiber-reinforced resin sheet and the rear surface side fiber-reinforced resin sheet that corresponds to the through-hole of the bracket is provided in the through-hole of the bracket to thereby bond the bonding member to the bracket.

3. The composite member as recited in claim 2, wherein:
the portion of the at least one of the front surface side fiber-reinforced resin sheet and the rear surface side fiber-reinforced resin sheet that corresponds to the through-hole of the bracket is provided in the through-hole of the bracket to form a recessed portion, and a spacer having a predetermined thickness is disposed in the recessed portion, and
the spacer and the at least one of the front surface side fiber-reinforced resin sheet and the rear surface side fiber-reinforced resin sheet are covered with a coating fiber-reinforced resin sheet such that the front surface side fiber-reinforced resin sheet, the rear surface side fiber-reinforced resin sheet, the spacer, the coating fiber-reinforced resin sheet and the bracket are integrally bonded to each other with the resin.

4. The composite member as recited in claim 1, wherein:
the front surface side fiber-reinforced resin sheet is a first fiber layer in which a nap is provided on a rear surface of a first fiber substrate,
the rear surface side fiber-reinforced resin sheet is a second fiber layer in which a second nap is provided on a front surface of a second fiber substrate,
the first fiber layer is disposed on the front surface side of the bracket and the nap of the first fiber layer is provided in the through-hole of the bracket,
the second fiber layer is disposed on the rear surface side of the bracket and the second nap of the second fiber layer is provided in the through-hole of the bracket, and
the first fiber layer, the second fiber layer and the bracket are integrally bonded to each other with the resin such that the nap of the first fiber layer and the second nap of the second fiber layer are intertwined with each other inside the through-hole of the bracket.

5. The composite member as recited in claim 1, wherein the front surface side fiber-reinforced resin sheet is a first fiber layer in which a nap is provided on a rear surface of a first fiber substrate,
the rear surface side fiber-reinforced resin sheet is a second fiber layer in which a second nap is provided on a front surface of a second fiber substrate,
the first fiber layer is disposed on the front surface side of the bracket and the nap of the first fiber layer is provided in the through-hole of the bracket,
the second fiber layer is disposed on the rear surface side of the bracket, and
a nonwoven fabric layer is disposed between the second fiber layer and the bracket, and the first fiber layer, the second fiber layer, the nonwoven fabric layer and the bracket are bonded to each other with the resin such that a fiber of the nonwoven fabric layer is intertwined with both the nap of the first fiber layer and the second nap of the second fiber layer provided in the through-hole of the bracket.

6. The composite member as recited in claim 1, wherein the front surface side fiber-reinforced resin sheet is a first fiber layer in which a nap is provided on a rear surface of a first fiber substrate,
the rear surface side fiber-reinforced resin sheet is a second fiber layer made of a second fiber substrate,
the first fiber layer is disposed on the front surface side of the bracket and the nap of the first fiber layer is provided in the through-hole of the bracket,
the second fiber layer is disposed on the rear surface side of the bracket, and
a nonwoven fabric layer is disposed between the second fiber layer and the bracket, and the first fiber layer, the second fiber layer, the nonwoven fabric layer and the bracket are bonded to each other with the resin, such that fibers of the nonwoven fabric layer are intertwined with the nap of the first fiber layer provided in the through-hole of the bracket.

* * * * *